(12) United States Patent
Hwang et al.

(10) Patent No.: US 8,760,843 B2
(45) Date of Patent: Jun. 24, 2014

(54) CAPACITIVE DEVICE AND METHOD FOR FABRICATING THE SAME

(75) Inventors: Jong Taek Hwang, Cheongju-si (KR); Han Choon Lee, Seoul (KR); Oh Jin Jung, Hwaseong-si (KR); Jin Youn Cho, Gunpo-si (KR)

(73) Assignee: Dongbu Hitek Co., Ltd., Bucheon (KR)

( * ) Notice: Subject to any disclaimer, the term of this patent is extended or adjusted under 35 U.S.C. 154(b) by 103 days.

(21) Appl. No.: 13/560,318

(22) Filed: Jul. 27, 2012

(65) Prior Publication Data
US 2013/0314838 A1 Nov. 28, 2013

(30) Foreign Application Priority Data

May 23, 2012 (KR) ........................ 10-2012-0054596

(51) Int. Cl.
*H01G 4/30* (2006.01)
*H01G 4/005* (2006.01)
*H01G 4/228* (2006.01)
*H01G 4/40* (2006.01)
(52) U.S. Cl.
CPC ................. *H01G 4/30* (2013.01); *H01G 4/005* (2013.01); *H01G 4/228* (2013.01); *H01G 4/40* (2013.01)
USPC ...................... 361/301.4; 361/301.2; 361/305; 361/311; 361/313; 361/306.2
(58) Field of Classification Search
CPC ......... H01G 4/30; H01G 4/005; H01G 4/228; H01G 4/33; H01G 4/40
USPC ........... 361/301.4, 301.2, 303–305, 311–313, 361/306.2, 306.1, 321.1
See application file for complete search history.

(56) References Cited

U.S. PATENT DOCUMENTS 6,384,444 B2 * 5/2002 Sakoh ........................... 257/303
(Continued)

FOREIGN PATENT DOCUMENTS

| KR | 10-2005-0069480 A | 7/2005 |
| KR | 10-2005-0101020 A | 10/2005 |
| KR | 1020060078672 | 7/2006 |

OTHER PUBLICATIONS

Kim, Yeong Pil; "A Method for fabricating MIM capacitor"; English translation of Abstract of Korean Patent Publication No. 10-2005-0069480; Publication Date: Jul. 5, 2005; Korean Intellectual Property Office (KR).
Kim, Kwan Su; "A semiconductor device having a capacitor structure"; English translation of Abstract of Korean Patent Publication No. 10-2005-0101020; Publication Date: Oct. 20, 2005; Korean Intellectual Property Office (KR).
(Continued)

*Primary Examiner* — Nguyen T Ha
(74) *Attorney, Agent, or Firm* — Murabito Hao & Barnes LLP; Andrew D. Fortney (57) ABSTRACT

A capacitive device includes a first capacitor including a first wiring layer, a first dielectric film, a first conductive layer, a first insulating layer on the first capacitor, a second capacitor on the first insulating layer including a second conductive layer, a second dielectric film, and a third conductive layer, a second insulating layer on the second capacitor, a second wiring layer on the second insulating layer including first and second connection wires, a first via connecting the first wiring layer to the second conductive layer, a second via connecting the third conductive layer to the second wiring layer, a third via connecting the first connection wire to the first conductive layer, and a fourth via connecting the second connection wire to the first wiring layer.

18 Claims, 10 Drawing Sheets

(56) References Cited

U.S. PATENT DOCUMENTS

| | | | |
|---|---|---|---|
| 6,762,446 B2 * | 7/2004 | Amiotti et al. | 257/296 |
| 7,301,218 B2 * | 11/2007 | Lee | 257/535 |
| 7,417,296 B2 * | 8/2008 | Akiyama | 257/500 |
| 7,663,861 B2 * | 2/2010 | Nishiura | 361/306.2 |
| 8,130,483 B2 * | 3/2012 | Chung | 361/301.4 |

OTHER PUBLICATIONS

Office Action, Korean Patent Application No. 10-2012-0054596, dated Sep. 25, 2013; Korean Intellectual Property Office (KR).

Notice of Allowance dated Feb. 24, 2014, Korean Patent Application No. 10-2012-0054596.

Abstract of Korean Patent Publication No. 1020060078672, 2 pages, http://engpat.KIPRIS.org.kr, Korea.

* cited by examiner

CAPACITIVE DEVICE AND METHOD FOR FABRICATING THE SAME

CROSS REFERENCE TO RELATED APPLICATION

This application claims the benefit of Korean Patent Application No. 10-2012-0054596, filed on May 23, 2012, which is hereby incorporated by reference as if fully set forth herein.

FIELD OF THE DISCLOSURE

Embodiments relate to a metal-insulator-metal (MIM) capacitor and a method for fabricating the same.

DISCUSSION OF THE RELATED ART

An MIM capacitor can be embodied to have a low series resistance and a high Q (Quality Factor) value. Due to these performance characteristics, an MIM capacitor is a common device used in analog and RF circuits.

The MIM capacitor may have two electrodes of a conductive material, with a dielectric provided therebetween. By using a dielectric having a high dielectric constant, making an area of the dielectric larger, or making a thickness of the dielectric thinner, and a capacitance of the MIM capacitor can increase.

However, such embodiments can cause the following problems. First, an increased capacitance may result when the dielectric constant of the dielectric is not sufficiently high, and an increase in the dielectric area increases a size of the capacitor or chip, thereby increasing production costs. Lastly, if the dielectric is made too thin, the reliability of the MIM capacitor may decrease.

This "Discussion of the Related Art" section is provided for background information only. The statements in this section are not an admission that the subject matter disclosed in this section constitutes prior art to the present disclosure, and no part of this section may be used as an admission that any part of this application, including this "Discussion of the Related Art" section, constitutes prior art to the present disclosure.

SUMMARY OF THE DISCLOSURE

Accordingly, the present invention is directed to a capacitive device (e.g., a capacitor) and a method for fabricating the same.

An object of the present invention is to provide a capacitive device (e.g., a capacitor) and a method for fabricating the same that does not require an increased chip size, does not decrease reliability, and provides a large capacitance.

Additional advantages, objects, and features of the disclosure will be set forth in part in the description that follows and in part will become apparent to those having ordinary skill in the art upon examination of the following, or may be learned from practice of the invention. The objectives and other advantages of the present invention may be realized and attained by the structure particularly pointed out in the written description and claims hereof, as well as the appended drawings.

To achieve these objects and other advantages and in accordance with the purpose of the present invention, as embodied and broadly described herein, a capacitive device according to the present invention comprises (i) a first capacitor including a first wiring layer, a first dielectric film, and a first conductive layer, (ii) a first insulating layer on the first capacitor, (iii) a second capacitor on the first insulating layer including a second conductive layer, a second dielectric film, and a third conductive layer, (iv) a second insulating layer on the second capacitor, (v) a second wiring layer on the second insulating layer comprising a first connection wire and a second connection wire, (vi) a first via through the first insulating layer and the first dielectric film and connecting the first wiring layer to the second conductive layer, (vii) a second via through the second insulating layer and connecting the third conductive layer to the second wiring layer, (viii) a third via through the first insulating layer and the second insulating layer and connecting the first connection wire to the first conductive layer, and (ix) a fourth via through the first insulating layer, the second insulating layer, and the first dielectric film and connecting the second connection wire to the first wiring layer.

The second capacitor may be vertically aligned with the first conductive layer. The second capacitor may have a portion that is aligned with or that overlaps the first conductive layer in a vertical direction.

The first via may pass through the first conductive layer, and the third via may pass through the second capacitor. The first conductive layer may have a first opening therein in which the first via is formed, and a portion of the first insulating layer may be between the first conductive layer and the first via.

The second capacitor may have a second opening therein in which the third via is formed, and a portion of the second insulating layer may be between the second capacitor and the third via. The first via may be located outside of an outer periphery of the first conductive layer, and the third via may be outside of an outer periphery of the second capacitor.

The first and second wiring layers may comprise material that is different from the first, second, and third conductive layers, and the respective thicknesses of the first and second wiring layers may be different from each other.

Each of the second conductive layer, the second dielectric film, and the third conductive layer may have an area that is the same as that of the first conductive layer.

In another aspect of the present invention, a method for fabricating a capacitive device includes (i) forming a first wiring layer, a first dielectric film, and a first conductive layer on a substrate, (ii) forming a first insulating layer on the first conductive layer, (iii) forming a first via in contact with the first wiring layer through the first insulating layer and the first dielectric film, (iv) forming a second conductive layer, a second dielectric film, and a third conductive layer on the first insulating layer and the first via, (v) forming a second insulating layer on the first insulating layer and the third conductive layer, (vi) forming a second via in contact with the third conductive layer through the second insulating layer, a third via in contact with the first conductive layer through the second insulating layer and the first insulating layer, and a fourth via in contact with the first wiring layer through the second insulating layer, the first insulating layer, and the first dielectric film, and (vii) forming a second wiring layer on the second insulating layer in contact with the second, third, and fourth vias.

The method may further include forming a first opening through the first conductive layer that exposes a portion of the first dielectric film before forming the first insulating layer, wherein the first via is formed in the first opening. Additionally or alternatively, the method may further include forming a second opening through the second conductive layer, the second dielectric film, and the third conductive layer that exposes a portion of the first insulating layer, before forming the second insulating layer, wherein the third via is formed in the second opening.

The second conductive layer, the second dielectric film, and the third conductive layer may be vertically aligned with the first conductive layer.

The method may further include forming a third opening that exposes a portion of the first dielectric film simultaneously with forming the first opening, and forming a fourth opening that exposes another portion of the first insulating layer and is vertically aligned with the third opening simultaneously with forming the second opening, wherein the fourth via is formed in the third opening and the fourth opening.

The method may further include patterning the first conductive layer, wherein forming the first opening exposes a portion of the first dielectric film that is adjacent to a first end of the first conductive layer, and forming the second opening exposes a portion of the first dielectric film that is adjacent to a second or opposite end of the first conductive layer, wherein the first via is formed in the first opening, and the fourth via is formed in the second opening.

The method may further include forming the third opening to exposes a portion of the second insulating layer by patterning the third conductive layer, the second dielectric film, and the second conductive layer to vertically overlap a portion of each of the third conductive layer, the second dielectric film, and the second conductive layer and the first conductive layer before forming the second insulating layer. The third via and the fourth via may be formed in the third opening.

Forming the second wiring layer may include forming a first connection wire on the second insulating layer that is in contact with the second via and the third via, and forming a second connection wire on the second insulating layer that is in contact with the fourth via and is separated from the first connection wire.

Embodiments of the present invention provide a capacitive device having a large capacitance that does not require a large chip size or decrease reliability.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. In description of embodiments, if it is described that a layer (a film), a region, a pattern, or a structure is formed "on" or "under" a substrate, a layer (a film), a region, a pad, or a pattern, the "on", or "under" implies that the layer (the film), the region, the pattern, or the structure is formed "on" or "under" the substrate, the layer (the film), the region, the pad, or the pattern directly or indirectly, with other substrate, layer (film), region, pad, or pattern therebetween. Additionally, a reference to the terms "on" or "under" is shown in at least one of the accompanying drawings.

A size of a layer shown in a drawing can be exaggerated, omitted or shown schematically for convenience or clarity of the description. Additionally, a size of an element may not be shown to actual scale. Wherever possible, the same reference numbers will be used throughout the drawings to refer to the same or like parts. An MIM capacitor and a method for fabricating the same in accordance with an embodiment of the invention will now be described with reference to the attached drawings.

Figure 1:
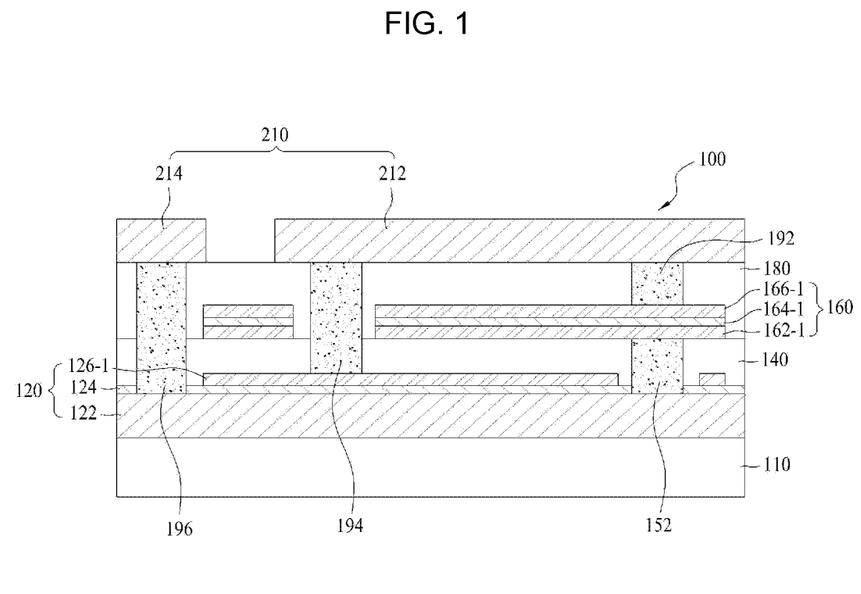
FIG. 1 illustrates a plan view of a capacitive device in accordance with a first embodiment of the present invention.

FIG. 1 illustrates a plan view of a capacitive device 100 in accordance with a first embodiment of the invention.

Referring to FIG. 1, the capacitive device 100 may include a substrate 110, a first capacitor 120 having a first wiring layer 122, a first dielectric film 124, and a first conductive layer 126-1, a second capacitor 160 having a first insulating layer 140, a second conductive layer 162-1, a second dielectric layer 164-1, and a third conductive layer 166-1, a second insulating layer 180, first, second, third, and fourth vias 152, 192, 194, and 196, respectively, and a second wiring layer 210.

The first capacitor 120 may include the first wiring layer 122, the first dielectric film 124, and a first conductive layer 126 stacked on the substrate 110.

The wiring layer 122 is formed on the substrate 110. The first wiring layer 122 may be connected to a transistor and/or other device (not shown). The first dielectric film 124 is formed on the first wiring layer 122.

The first conductive layer 126-1 is formed on the first wiring layer 122, and may expose a portion of the first dielectric film 124.

The first dielectric film 124 may be formed on the first wiring layer 122, before the first conductive layer 126-1. The first wiring layer 122 may comprise a material that is different from the first conductive layer 126-1.

The first conductive layer 126-1 may have an area smaller than a corresponding area of the first wiring layer 122. The first wiring layer 122 may have a thickness greater than a thickness of the first conductive layer 126-1. For example, the first wiring layer 122 may have a thickness of from about 2 μm to about 3 μm, and the first conductive layer 126-1 may have a thickness of from about 1 μm to 1.5 μm. When the thickness of the first wiring layer 122 is less than about 2 μm, the first wiring layer 122 may have a high resistance and may not have sufficiently good properties for wiring.

The first insulating layer 140 is formed on the first capacitor 120. For example, the first insulating layer 140 may be on the first conductive layer 126-1 and the first dielectric film 124. First insulating layer 140 may cover the first conductive layer 126-1.

The first via 152 is in contact with a portion of the first wiring layer 122 that is exposed by the first conductive layer 126-1, the first insulating layer 140, and the first dielectric film 124. The first insulating layer 140 (or a portion thereof) may be between a portion of the first via 152 and the first conductive layer 126-1.

The second capacitor 160 is formed on the first insulating layer 140. That is, the second conductive layer 162-1, the second dielectric layer 164-1, and the third conductive layer 166-1 may be formed on the first insulating layer 140, in succession.

The first wiring layer 122 or the second wiring layer 210 may have a thickness greater than a thickness of the second conductive layer 162-1 and the third conductive layer 166-1. The second conductive layer 162-1 and the third conductive layer 166-1 may have a thickness that is the same as that of the first conductive layer 126-1. Also, each of the second conductive layer 162-1, second dielectric layer 164-1, and the third conductive layer 166-1 may have the same area as one another. However, the area of the second dielectric layer 164-1 is smaller than an area of the first wiring layer 122.

In some embodiments, the second conductive layer 162-1, the second dielectric layer 164-1, and the third conductive layer 166-1 are vertically aligned with the first conductive layer 126-1. Additionally, in some embodiments, the second conductive layer 162-1, the second dielectric layer 164-1, and the third conductive layer 166-1 may have an area that is equal to that of the first conductive layer 126-1.

The second capacitor 160, comprising the second conductive layer 162-1, the second dielectric layer 164-1, and the third conductive layer 166-1 may expose a portion of the first insulating layer 140.

The second insulating layer 180 is formed on the portion of the first insulating layer 140 adjacent to and/or exposed by the second capacitor 160, the third conductive layer 166-1, the second dielectric layer 164-1, and the second conductive layer 162-1. The second insulating layer 180 may be in contact with the portion of the first insulating layer 140 exposed by the patterned second capacitor 160.

The second via 192 is in contact with an uppermost side or surface of the third conductive layer 166-1 and passes through the second insulating layer 180. For example, the second via 192 may have a first end or portion in contact with the uppermost side or surface of the third conductive layer 166-1, and a second, opposite end or portion exposed through the second insulating layer 180.

The third via 194 is in contact with an uppermost side or surface of the first conductive layer 126-1, and is formed in a portion of the second insulating layer 180 that is adjacent to the second capacitor 160, and in an exposed portion of the first insulating layer 140. For example, the third via 194 may be in contact with the first or uppermost side or portion of the first conductive layer 126-1, and formed in an exposed portion of the second insulating layer 180, adjacent to the third conductive layer 166-1, the second dielectric layer 164-1, the second conductive layer 162-1, and in an exposed portion of the first insulating layer 140.

A portion of the second insulating layer 180 may be between portions of the third conductive layer 166-1, the second dielectric layer 164-1, and the second conductive layer 162-1. The third via 194 may pass through the second insulating layer 180.

The fourth via 196 may be in contact with an uppermost side or surface of the first wiring layer 122 and may pass through portions of the first dielectric film 124, the second insulating layer 180, and the first insulating layer 140 in an area horizontally adjacent to the first conductive layer 126-1. The fourth via 196 may thus be positioned or located on one (i.e., a same) side of the first capacitor 120 and the second capacitor 160. For example, the fourth via 196 may have one end or surface in contact with the uppermost side or surface of the first wiring layer 122, and a second or opposite end or surface exposed through the uppermost side or surface of the second insulating layer 180.

The second wiring layer 210 is formed on the second insulating layer 180, and may include a first connection wire 212 in contact with the second via 192 and the third via 194, and a second connection wire 214 in contact with the fourth via 196. The first connection wire 212 and the second connection wire 214 may be separated from each other both physically and electrically.

The first via 152, the second via 192, and the third via 194 may connect the first capacitor 120 and the second capacitor 160 in parallel.

In order to increase the capacitance of a capacitor, an area of the dielectric may be increased, or a dielectric having a high dielectric constant may be used. However, the increased area or the use of a dielectric having a high dielectric constant can increase the chip size and decrease the reliability of the capacitor. The present embodiment(s) provide a structure in which a plurality of capacitors (e.g., capacitors 120 and 160) are connected in parallel using vias (e.g., vias 152, 192, and 194) that contact the conductive layers 126, 162-1, and 166-1, and that pass through the dielectric films 124 and 164-1 of the capacitors. The present embodiment(s) can provide an increased capacitance in comparison to conventional capacitors, regardless of the areas and dielectric constants of the dielectric films 124 and 164-1.

Moreover, since a plurality of capacitors (for example, capacitors 120 and 160 in FIG. 1) can be connected in parallel within the insulating layers 140 and 180 and positioned or located between substrate 110 (including the first wiring layer 120) and the second wiring layer 210, a capacitive device having a large capacitance can be provided, regardless of the number of the wiring layers included in or on the device.

The present capacitive device does not require an increase in chip size or result in a decrease in reliability, and provides a large capacitance in comparison to conventional devices.

Figure 2:
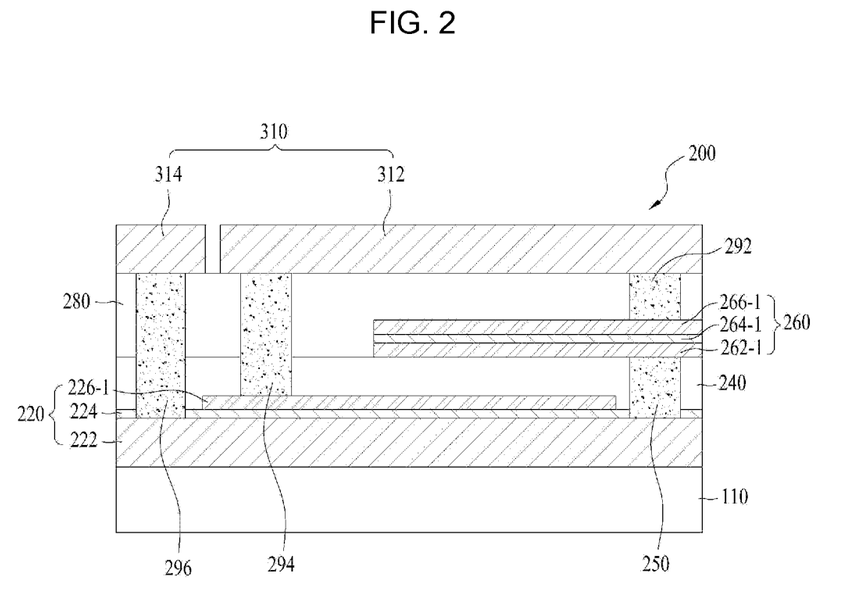
FIG. 2 illustrates a plan view of a capacitive device in accordance with a further embodiment of the present invention.

FIG. 2 illustrates a plan view of a capacitive device in accordance with a further embodiment of the present invention.

Referring to FIG. 2, the capacitive device in accordance with a further embodiment may be a variation of the capacitive device of the first embodiment discussed above with respect to FIG. 1. The first embodiment suggests that the first conductive layer 126-1 and the second capacitor 160 are vertically aligned. However, the embodiment of FIG. 2 is not characterized by the vertical alignment of the first conductive layer 126-1 and the second capacitor 160 as shown in FIG. 1, but instead, by no vertical overlap of at least a portion of each of the first conductive layer 126-1 and the second capacitor 160. In this instance, the vertical direction is a direction facing the second wiring layer 310 from the first wiring layer 222. Additionally, vias 250, 292, 294, and 296 in the embodiment of FIG. 2 may be different from the vias 152, 192, 194, and 196 in the first embodiment in view of the positions thereof and the layers the vias pass through.

The capacitive device 200 may include a substrate 110, a first capacitor 220 having a first wiring layer 222, a first dielectric film 224, and a first conductive layer 226-1, a first insulating layer 240, a second capacitor 260 having a second conductive layer 262-1, a second dielectric layer 264-1, and a third conductive layer 266-1, a second insulating layer 280, first to fourth vias 250, 292, 294, and 296, respectively, and a second wiring layer 310.

The first wiring layer 222 is formed on the substrate 110. The first wiring layer 222 may comprise materials similar to or the same as those of the first wiring layer 122 discussed above with respect to FIG. 1. The first dielectric film 224 is formed on the first wiring layer 222. The first conductive layer 226-1 is formed on the first wiring layer 222, and may expose a portion of the first dielectric film 224.

The first insulating layer 240 is formed on the first conductive layer 226-1 and the first dielectric film 224, and covers the first conductive layer 226-1. The first via 250 is in contact with the first wiring layer 222 and passes through the first insulating layer 240 and the first dielectric film 224.

The first via 250 does not pass through the first conductive layer 226-1, but is adjacent to (e.g., positioned or located outside of an outer periphery of) the first conductive layer 226-1 of the first capacitor 220. For example, the first via 250 may be in contact with an uppermost side or surface of the first wiring layer 222 and pass through only the first insulating layer 240 and the first dielectric film 224 adjacent to the outer periphery of the first conductive layer 226-1 of the first capacitor 220.

The second capacitor 260 is formed on the first insulating layer 240. That is, the second conductive layer 262-1, second dielectric layer 264-1, and the third conductive layer 266-1 of the second capacitor 260 may be formed on the first insulating layer 240 in succession. The second conductive layer 262-1, the second dielectric layer 264-1, and the third conductive layer 266-1 may be patterned such that portions of the second conductive layer 262-1, the second dielectric layer 264-1, and the third conductive layer 266-1 vertically overlap with the first conductive layer 226-1. Additionally, the second capacitor 260 may expose a portion of the first insulating layer 240. That is, second capacitor 260 may not cover an entire uppermost surface of the first insulating layer 240. Furthermore, the second capacitor 260 may not be completely aligned with the first conductive layer 226-1 in the vertical direction, but only a portion of the second capacitor 260 may vertically overlap with the first conductive layer 226-1.

The second insulating layer 280 is formed on a portion of the first insulating layer 240 and the second capacitor 260, the second capacitor 260 comprising the third conductive layer 266-1, the second dielectric layer 264-1, and the second conductive layer 262-1. Stated differently, the second insulating layer 280 may be in contact with a portion of the first insulating layer 240 that is adjacent to the patterned second capacitor 260.

The second via 292 is in contact with an uppermost side or surface of the third conductive layer 266-1, and passes through the second insulating layer 280. For example, the second via 292 has one surface or end in contact with the uppermost side of the third conductive layer 266-1, and another (or opposite) surface or end exposed at an uppermost side or surface of the second insulating layer 280.

The third via 294 is in contact with an uppermost side or surface of the first conductive layer 226-1, and passes through a portion of the first insulating layer 240 that is exposed through the second insulating layer 280. The third via 294 does not pass through the second capacitor 260, but may be positioned or located outside of the outer periphery of the second capacitor 260. That is, the third via 294 may be in contact with an uppermost side or surface of the first conductive layer 226-1, and pass through the second insulating layer 280 and the first insulating layer 240 in a region adjacent to the outer periphery of the second capacitor 260.

The fourth via 296 may be in contact with the first wiring layer 222 and pass through the second insulating layer 280 on one side of the first capacitor 220 and the second capacitor 260, a portion of the first insulating layer 240 adjacent to the second capacitor 260, and a portion of the first dielectric film 224 adjacent to the first conductive layer 226-1.

FIGS. 3 to 12 illustrate various steps in an exemplary method for fabricating a capacitive device in accordance with a first embodiment of the present invention.

Figure 3:
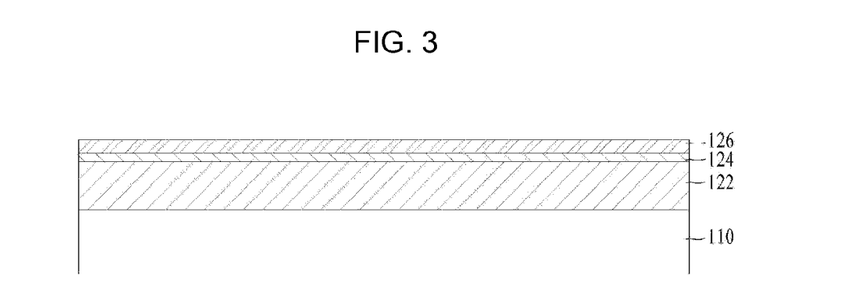
FIGS. 3 to 12 illustrate steps in a method for fabricating a capacitive device in accordance with the first embodiment.

Referring to FIG. 3, a first wiring layer 122, a first dielectric film 124, and a first conductive layer 126 are successively formed on a substrate 110. The first wiring layer 122 and the first conductive layer 126 may include at least one of Cu, Al, Ti, Ta, Pt, W, a Ti/TiN bilayer, a Ti/Al/TiN trilayer, or a Ta/TaN bilayer.

In this instance, the first wiring layer 122 may be a wiring layer that is connected to another device (not shown), such as a transistor, and serve as a wiring (e.g., an electrode) for the device. In such an embodiment, the first wiring layer 122 may comprise a material that is different from the first conductive layer 126. For example, the first wiring layer 122 may comprise Al or Cu, and the first conductive layer 126 may comprise a material selected from Ti, Ta, Pt, W, a Ti/TiN bilayer, a Ti/Al/TiN trilayer, or a Ta/TaN bilayer.

The first dielectric film 124 may include at least one of an ONO (oxide nitride oxide) film, a NON (nitride oxide nitride) film, or a film selected from the group consisting of BaSrTiO$_3$, PbZrTiO$_3$, TaO$_5$, SiN, SiO$_2$, Al$_2$O$_3$, HfO$_2$, SrTiO$_3$, CaTiO$_3$, LaAlO$_3$, BaZrO$_3$, and BaZrTiO$_3$ films.

Figure 4:
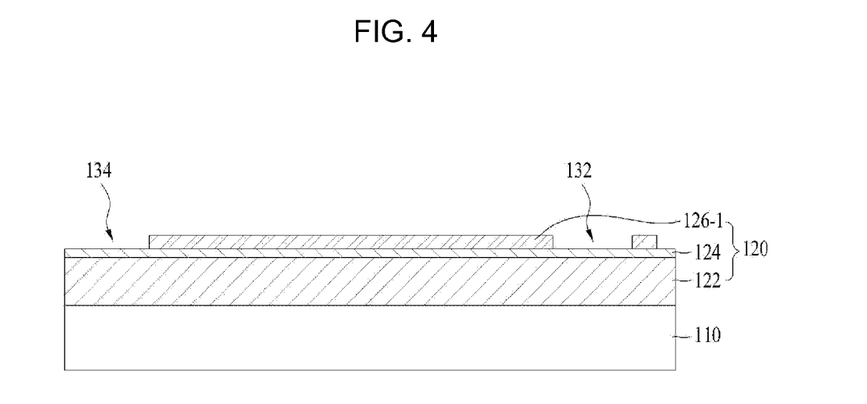

Referring to FIG. 4, the first conductive layer 126 is patterned to form the first capacitor 120. That is, the first conductive layer 126 is selectively etched to form openings 132 and 134 that expose the first dielectric film 124. For example, the first conductive layer 126 may be patterned by photolithography and selective etching to form a first opening 132 that exposes a first region of the first dielectric film 124, and a second opening 134 that exposes a second region of the first dielectric film 124. Each of the openings 132 and 134 may have a shape of, e.g., a recess, a trench, or a hole, but may be any other similar shape. The first capacitor 120 may include the first wiring layer 122, the first dielectric film 124, and the first conductive layer 126-1.

Figure 5:
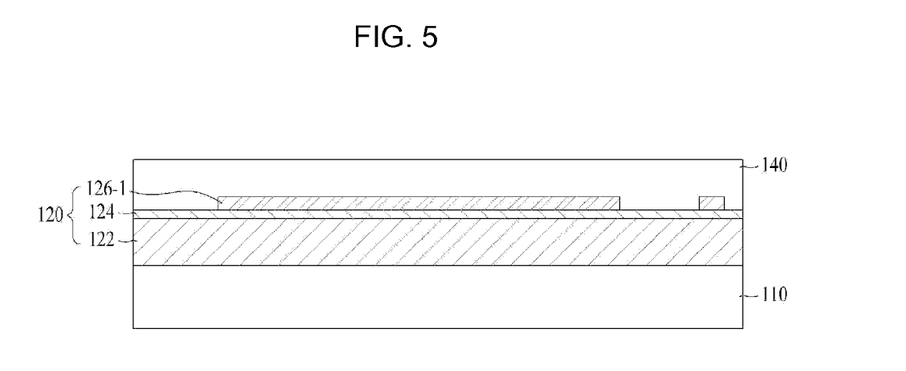

Referring to FIG. 5, a first insulating layer 140 is formed on the first conductive layer 126-1 and fills the openings 132 and 134 that expose portions of the first dielectric film 124, and is then planarized. For example, in some embodiments, an oxide is deposited in the openings 132 and 134 and on the first conductive layer 126-1, and subjected to chemical mechanical polishing (CMP) to form the first insulating layer 140.

Figure 6:
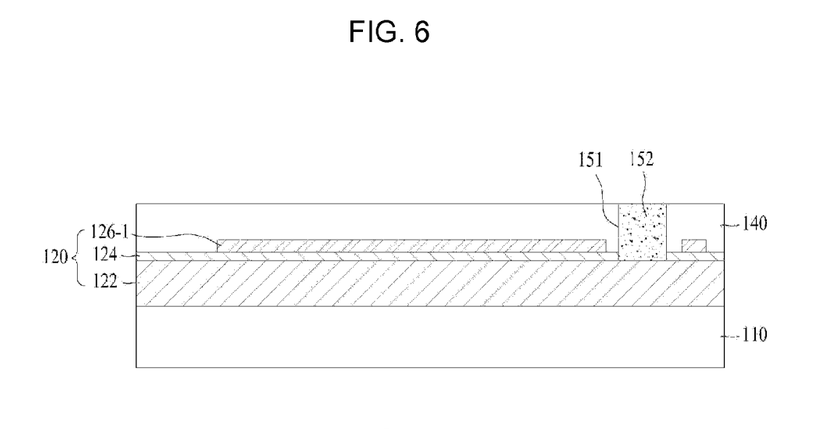

Referring to FIG. 6, a first via 152 is formed in contact with an uppermost side or surface of the first wiring layer 122. The first via 152 passes through a portion of the first dielectric film 124 that is exposed by the first opening 132. For example, the first insulating layer 140 in and/or over the first opening 132 and the first dielectric film 124 exposed by the first opening 132 is selectively etched to form a via hole 151, and a conductive material (for example, tungsten) is subsequently deposited in the via hole 151 to form the first via 152. In one embodiment, the via hole 151 may have a diameter that is smaller than a diameter of the first opening 132.

Figure 7:
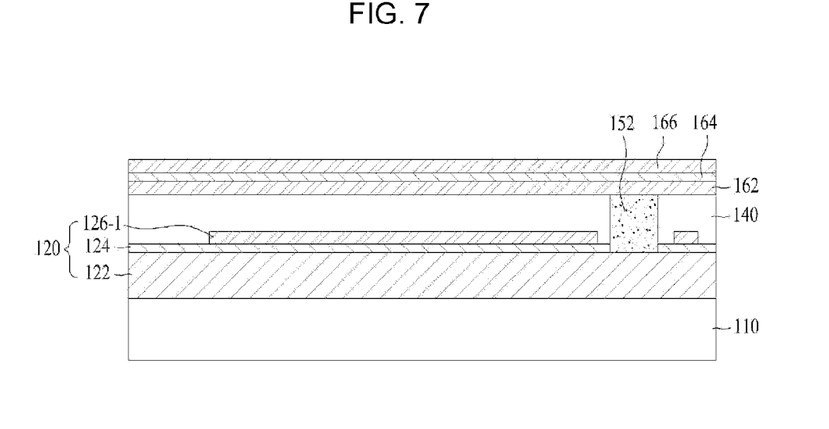

Referring to FIG. 7, a second conductive layer 162, a second dielectric layer 164, and a third conductive layer 166 are successively formed on the first insulating layer 140 and the first via 152. In this instance, a first side or surface (e.g., an underside or bottom surface) of the second conductive layer 162 may be in contact with a first or uppermost side or surface of the first via 152.

The second conductive layer 162 and the third conductive layer 166 may comprise a material that is the same as or similar to the first conductive layer 126 described above with reference to FIG. 3 (e.g., Cu, Al, Ti, Ta, Pt, etc.). Additionally, the second dielectric film 164 may comprise a material that is the same as or similar to the first dielectric film 124 described above with reference to FIG. 3.

Figure 8:
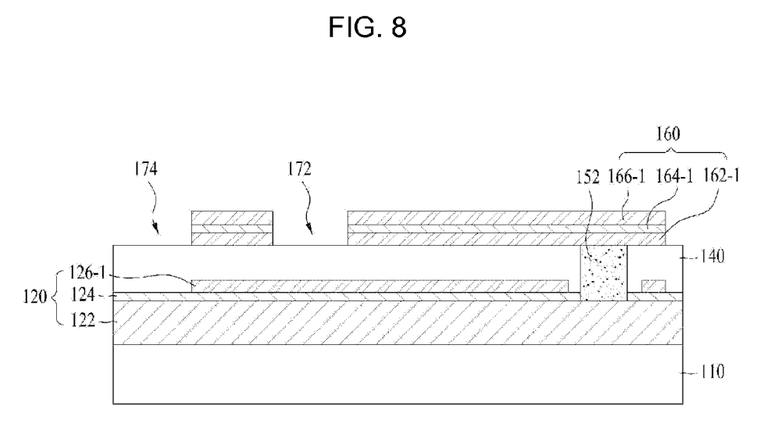

Referring to FIG. 8, to form a second capacitor 160, the third conductive layer 166, the second dielectric film 164, and the second conductive layer 162 are patterned. For example, the third conductive layer 166, the second dielectric film 164, and the second conductive layer 162 may be etched selectively, to align an edge or outermost periphery of the second capacitor 160 with an outermost edge or periphery of the first conductive layer 126-1 in a vertical direction and form openings 172 and 174 that expose the first insulating layer 140, respectively. The second capacitor 160 may include the third conductive layer 166-1, the second dielectric film 164-1, and the second conductive layer 162-1.

For example, the third conductive layer 166, the second dielectric film 164, and the second conductive layer 162 may be subjected to photolithography and selectively etching to form (i) a third opening 172 that exposes a first portion of a surface (e.g., an uppermost surface) of the first insulating layer 140, and (ii) a fourth opening 174 that exposes a second portion of the surface (e.g., an uppermost surface) of the first insulating layer 140.

In this embodiment, the third opening 172 may not be aligned with or may not overlap the first opening 132 (see FIG. 4) or the first via 152 in a vertical direction, but the fourth opening 174 may be aligned with or overlaps the second opening 134 in the vertical direction. The present invention, however, is not limited to such embodiments. In this instance, the vertical direction may be a direction in which an underlying layer (for example, first wiring layer 122) faces an overlying layer (for example, second conductive layer 162).

The patterned third conductive layer 166-1, the patterned second dielectric film 164-1, and the patterned second conductive layer 162-1 may have an area (e.g., a first or combined area) having a value that is about the same as that of the first conductive layer 126-1 (e.g., a second area). However, the present invention is not limited to such embodiments and the values of the first area and the second area may be different from each other. In this instance, the first area may be defined by the outermost surface or perimeter formed by the patterned third conductive layer 166-1 and the patterned second dielectric film 164-1 of the second capacitor 160, or an area defined by the outermost surface or perimeter formed by the patterned second dielectric film 164-1 and the patterned second conductive layer 162-1. Additionally, the area of the first capacitor 120 may be defined by the outermost surface or perimeter formed by the patterned first conductive layer 126-1 (and, optionally, the first dielectric film 124 of the first capacitor 120).

Figure 9:
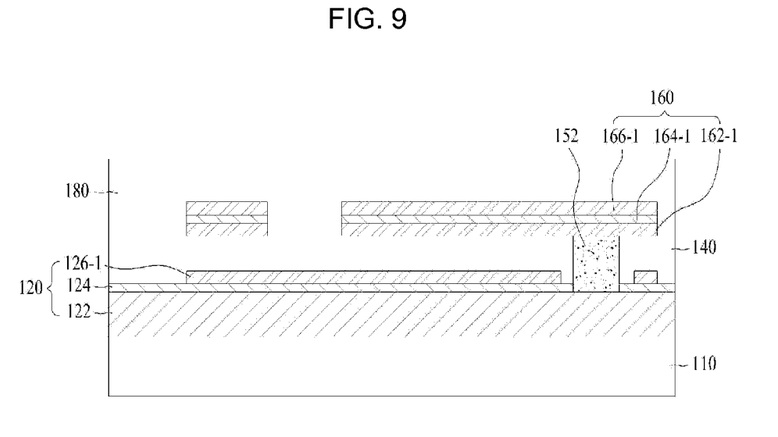

Referring to FIG. 9, a second insulating layer 180 is formed on the third conductive layer 166-1 (and optionally on sidewall surfaces of the second dielectric film 164-1 and the second conductive layer 162-1) and in the third opening 172 and the fourth opening 174, as discussed above with respect to FIG. 5, and then is planarized. For example, an oxide may be deposited in the third and fourth openings 172 and 174 and on the third conductive layer 166-1, and subjected to chemical mechanical polishing (CMP) to form the second insulating layer 180.

Figure 10:
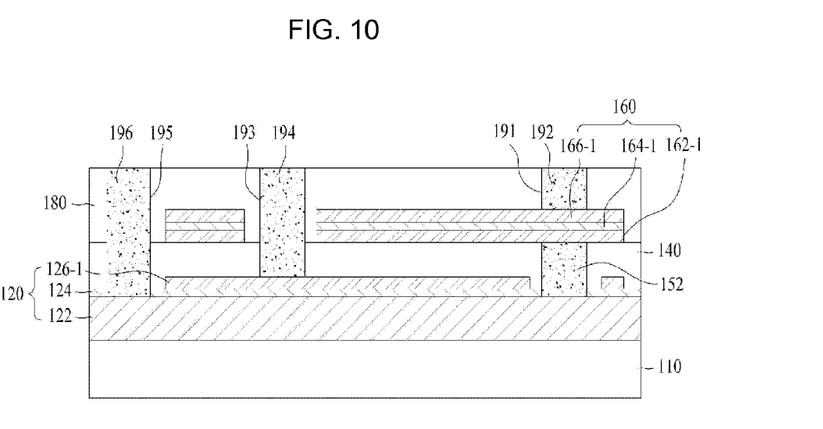
Figure 11:
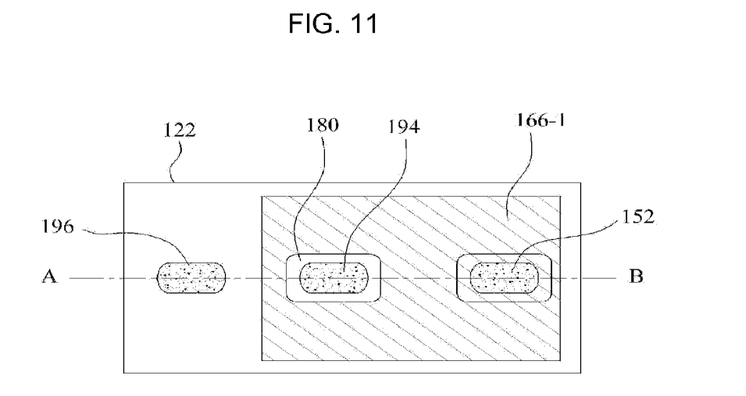

FIG. 10 illustrates a section of the capacitive device shown in FIG. 11 across an AB line or direction, and FIG. 11 may be a plan view of the capacitive device shown in FIG. 10.

Referring to FIGS. 10 and 11, a second via 192 is formed in contact with a first or uppermost side or surface of the patterned third conductive layer 166-1 and that passes through the second insulating layer 180. Additionally, and simultaneously, a third via 194 is formed in contact with a first or uppermost side or surface of the patterned first conductive layer 126-1. The third via 194 passes through the second insulating layer 180 and the first insulating layer 140. Furthermore, and simultaneously, a fourth via 196 is formed in contact with a first or uppermost side or surface of the first wiring layer 122. The fourth via 196 passes through the second insulating layer 180, the first insulating layer 140, and the first dielectric film 124. In this instance, the third via 194 may pass through the opening 172, and the fourth via 196 may pass through the opening 174 (e.g., see FIG. 8). For example, the second insulating layer 180 on or over on the third conductive layer 166-1 may be etched selectively to form a second via hole 191 and expose a portion of the uppermost side or surface of the third conductive layer 166-1. Additionally, and simultaneously, the second insulating layer 180 and the first insulating layer 140 may be etched selectively to form a third via hole 193 that passes through the third opening 172. Furthermore, and simultaneously, the second insulating layer 180, the first insulating layer 140, and the first dielectric film 124 may be etched selectively to form a fourth via hole 195 that passes through the fourth opening 174 and the second opening 134.

Next, a conductive material (for example, tungsten) may be deposited to fill the second to fourth via holes 191, 193 and 195, respectively, then the conductive material may be planarized to form the second via 192, the third via 194, and the fourth via 196.

Figure 12:
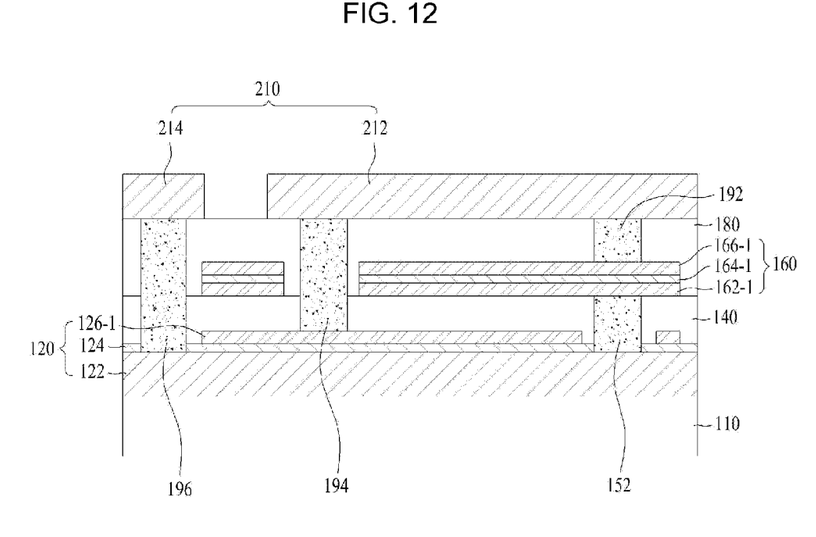

Referring to FIG. 12, a wiring layer 210 is formed on the second insulating layer 180 and a first or uppermost surface of the second to fourth vias 192, 194, and 196, respectively. The first wiring layer 122 may be called an $n^{th}$ wiring layer (for example, where n is a natural number that is greater than or equal to 1) and the second wiring layer 210 may be called an $(n+1)^{th}$ wiring layer (for example, where n=2, n is 3).

For example, a first connection wire 212 may be formed in contact with the second via 192 and the third via 194, and a second connection wire 214 may be formed in contact with the fourth via 196. The first connection wire 212 and the second connection wire 214 may be formed on the second insulating layer 180 spaced or separate from each other. The second wiring layer 210 may comprise a material that is the same as or different from that of the first wiring layer 122. Thus, the invention may include a plurality of capacitors (e.g., capacitors 120 and 160) formed in parallel between an $n^{th}$ wiring layer and an $(n+1)^{th}$ wiring layer (where n is a natural number and n≥1) using the first through fourth vias (e.g., the vias 152, 192, 194, and 196).

FIGS. 13 to 22 illustrate steps in a method for fabricating a capacitive device in accordance with a further embodiment of the present invention.

Figure 13:
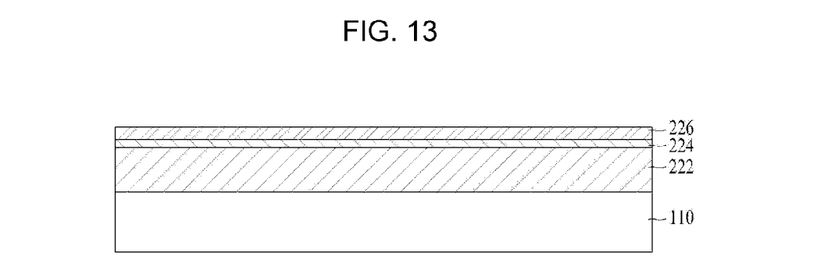
FIGS. 13 to 22 illustrate steps in a method for fabricating a capacitive device in accordance with the further embodiment.

Referring to FIG. 13, a first wiring layer 222, a first dielectric film 224, and a first conductive layer 226 are successively formed on a substrate 110. The first wiring layer 222, the first dielectric film 224, and the first conductive layer 226 may be the same as those discussed above with respect to FIG. 3.

Figure 14:
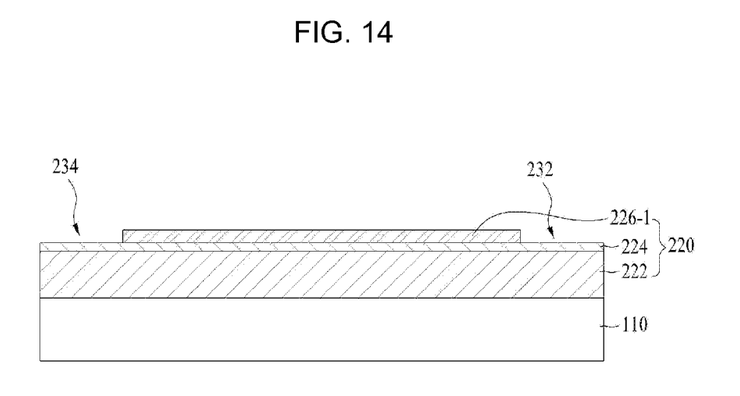

Referring to FIG. 14, the first conductive layer 226 is patterned to form a first capacitor 220. That is, the first conductive layer 226 is etched selectively to form a patterned first conductive layer 226-1 and first and second openings 232 and 234, respectively that expose first dielectric film 224. The first opening 232 may expose a portion of the first dielectric film 224 that is adjacent to a first end, edge or sidewall of the patterned first conductive layer 226-1, and the second opening 234 may expose another portion of the first dielectric film that is 224 adjacent to another (e.g., an opposite or second end, edge or sidewall) of the patterned first conductive layer 226-1. Thus, in the cross-section shown in FIG. 14, the exposed portions of the first dielectric film 224 may be at opposite ends, edges or sidewalls of the patterned first conductive layer 226-1.

Figure 15:
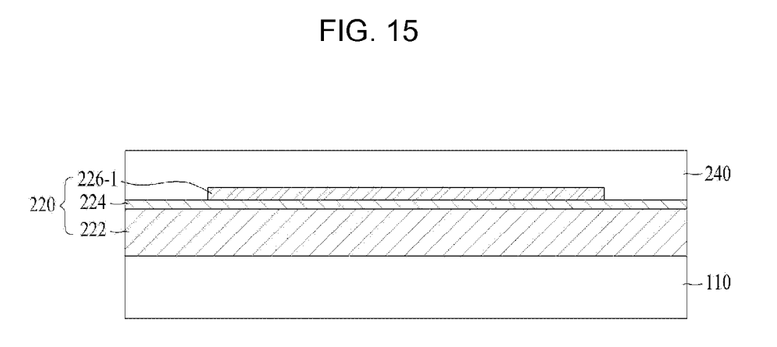

Referring to FIG. 15, a first insulating layer 240 is formed on the patterned first conductive layer 226-1 and in the first and second openings 232 and 234, and is subsequently planarized.

Figure 16:
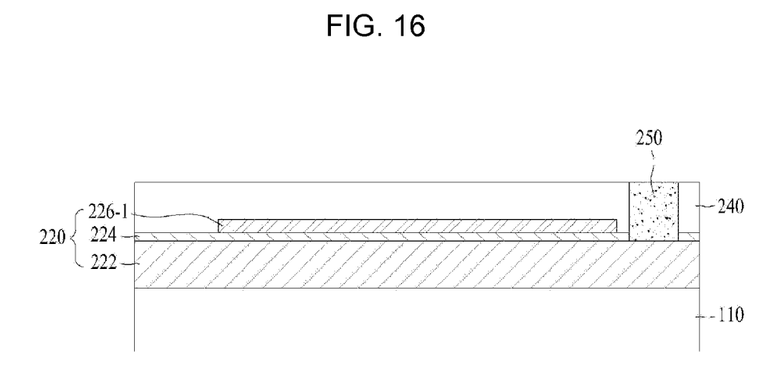

Referring to FIG. 16, a first via 250 is formed in contact with a top side or surface (e.g., an uppermost surface) of the first conductive layer 222. The first via 250 passes through or is formed in a portion of the first dielectric film 224 that is exposed through the first opening 232.

Figure 17:
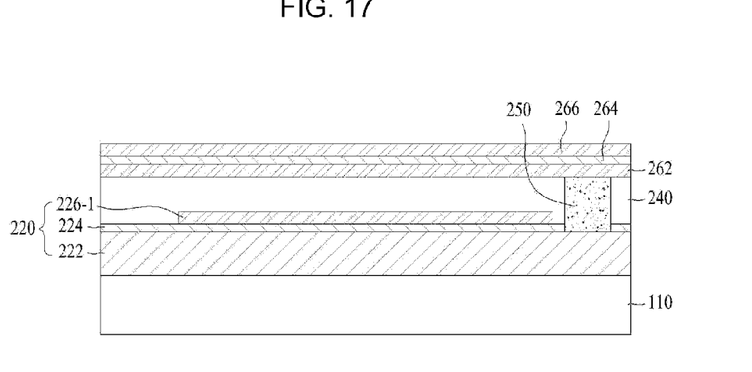

Referring to FIG. 17, a second conductive layer 262, a second dielectric film 264, and a third conductive layer 266 are formed on the first insulating layer 240 and the first via 250, in succession. In this instance, the second conductive layer 262 may have a first surface or side (e.g., a lowermost surface, a bottom surface, or an underside) that is in contact with a first or uppermost side or surface of the first via 250.

Figure 18:
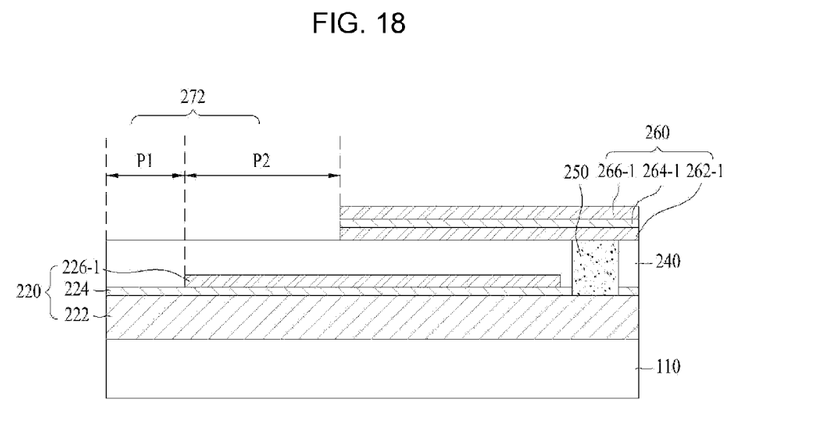

Referring to FIG. 18, to form a second capacitor 260, the third conductive layer 266, the second dielectric film 264, and the second conductive layer 262 are patterned such that a portion of each of the third conductive layer 266, the second dielectric film 264, and the second conductive layer 262 overlaps with the patterned first conductive layer 226-1 in a vertical direction. That is, the third conductive layer 266, the second dielectric film 264, and the second conductive layer 262 are etched selectively to form a third opening 272 that exposes a top portion or surface (e.g., an uppermost surface) of the first insulating layer 240.

The third opening 272 includes a first portion or region P1 that is vertically aligned with or that overlaps the second opening 234, and a second portion or region P2 that is vertically aligned with or that overlaps a portion of the patterned first conductive layer 226-1.

Figure 19:
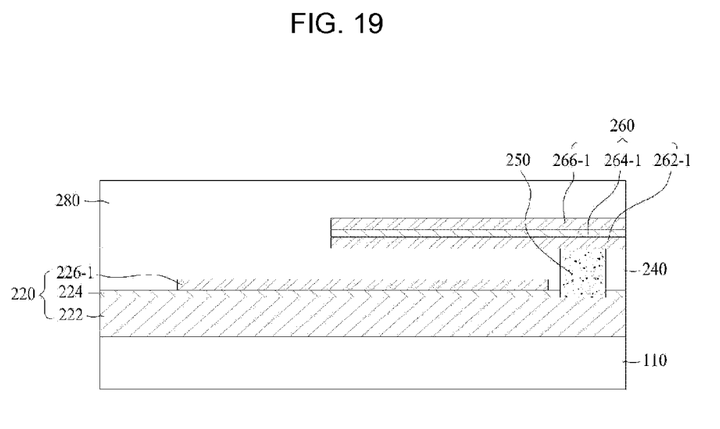

Referring to FIG. 19, a second insulating layer 280 is formed on the patterned third conductive layer 266-1, the patterned second dielectric film 264-1, and the patterned second conductive layer 262-1 and in the third opening 272.

Figure 20:
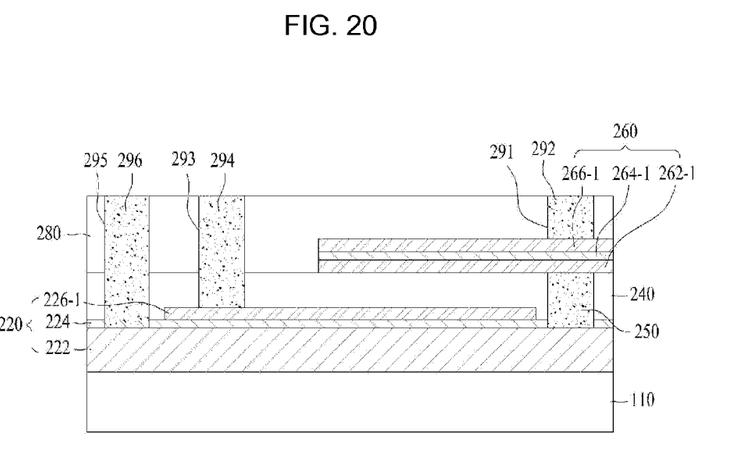
Figure 21:
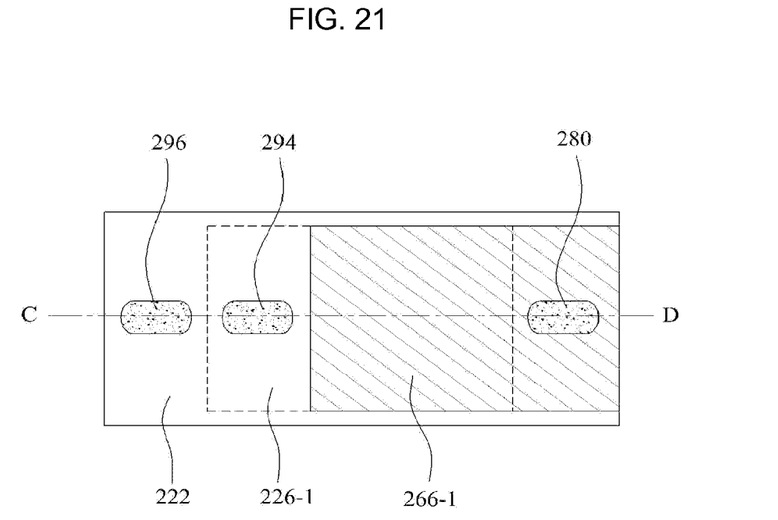

FIG. 20 illustrates a section across the C-D line or direction of the capacitive device illustrated in FIG. 21, and FIG. 21 may be a plan view of the capacitive device shown in FIG. 20.

Referring to FIGS. 20 and 21, a second via 292 is formed in contact with an uppermost or first side, surface, or portion of the patterned third conductive layer 266-1, and the second via 292 passes through a portion of the second insulating layer 280. Additionally, and simultaneously, a third via 294 is formed in contact with a first or uppermost side, surface, or portion of the first conductive layer 226-1 and the third via 294 passes through the second insulating layer 280 and the first insulating layer 240. Furthermore, and also simultaneously, a fourth via 294 is formed in contact with a first or uppermost side, surface, or portion of the first conductive layer 222. The fourth via 294 passes through the second insulating layer 280, the first insulating layer 240, and the first dielectric film 224.

For example, the second insulating layer 280 on the third conductive layer 266-1 may be etched selectively to form a second via hole 291 that exposes a portion of the first or uppermost side or surface of the third conductive layer 266-1. Additionally, and simultaneously, the second insulating layer 280 and the first insulating layer 240 may be etched selectively to form a third via hole 293 that passes through the second portion or region P2 of the third opening 272. Furthermore, and also simultaneously, the second insulating layer 280, the first insulating layer 240, and the first dielectric film 224 may be etched selectively, to form a fourth via hole 295 that passes through the first portion or region P1 of the third opening 272 and the second opening 234.

Then, a conductive material (for example, tungsten) may be deposited to fill the second, third, and fourth via holes 291, 293, and 295, respectively, and planarized to form the second via 292, the third via 294, and the fourth via 296. The third via 294 may pass through or be located in the second portion or region P2 of the third opening 272, and the fourth via 296 may pass through or be located in the first portion or region P1 of the third opening 272 and the second opening 234.

Figure 22:
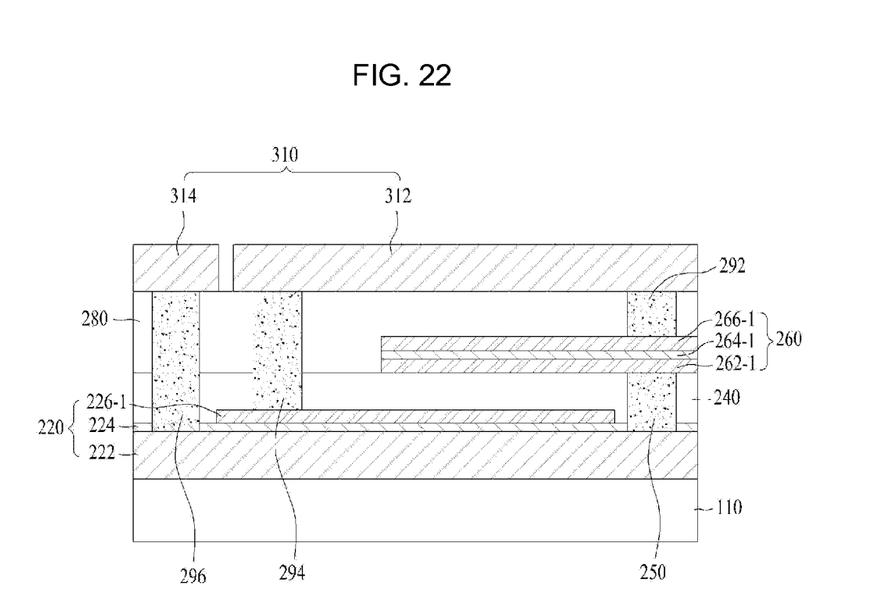

Referring to FIG. 22, a wiring layer 310 is formed on the second insulating layer 280 that includes the second, third, and fourth vias 292, 294, and 296, respectively, formed therein. For example, a first connection wire 312 may be in contact with the second via 292 (e.g., an uppermost surface thereof) and the third via 294 (e.g., an uppermost surface thereof), and a second connection wire 314 may be in contact with the fourth via 296 (e.g., an uppermost surface thereof). The first connection wire 312 and the second connection wire 314 may be separated or spaced apart from each other.

Characteristics, structures, effects, and so on described in the above embodiments are included in at least one embodiment, but they are not limited to only the described embodiment(s). Furthermore, it is apparent that the features, the structures, the effects, and so on described in the embodiments can be combined or modified with other embodiments by persons skilled in the art. Therefore, it is understood that such combination(s) and modification(s) are included in the scope of the present invention.

What is claimed is:

1. A capacitive device comprising:
  a first capacitor including a first wiring layer, a first dielectric film, and a first conductive layer;
  a first insulating layer on the first capacitor;
  a second capacitor on the first insulating layer, wherein the second capacitor includes a second conductive layer, a second dielectric film, and a third conductive layer;
  a second insulating layer on the second capacitor;
  a second wiring layer on the second insulating layer, wherein the second wiring layer includes a first connection wire and a second connection wire;
  a first via through the first insulating layer and the first dielectric film, and connecting the first wiring layer to the second conductive layer;
  a second via through the second insulating layer, and connecting the third conductive layer to the second wiring layer;
  a third via through the first insulating layer and the second insulating layer, and connecting the first connection wire to the first conductive layer; and
  a fourth via through the first insulating layer, the second insulating layer, and the first dielectric film, and connecting the second connection wire to the first wiring layer.

2. The capacitive device as claimed in claim 1, wherein the second capacitor is vertically aligned with the first conductive layer.

3. The capacitive device as claimed in claim 1, wherein the first conductive layer has a portion that is not vertically aligned with and that does not overlap with the second capacitor.

4. The capacitive device as claimed in claim 1, wherein the first via passes through the first conductive layer, and the third via passes through the second capacitor.

5. The capacitive device as claimed in claim 4, wherein the first conductive layer has a first opening through which the first via passes, and a portion of the first insulating layer is between the first conductive layer and the first via.

6. The capacitive device as claimed in claim 4, wherein the second capacitor has a second opening through which the third via passes, and a portion of the second insulating layer is between the second capacitor and the third via.

7. The capacitive device as claimed in claim 1, wherein the first via is outside an outer periphery of the first conductive layer, and the third via is outside an outer periphery of the second capacitor.

8. The capacitive device as claimed in claim 1, wherein the first and second wiring layers comprise a material that is different from that of the first, second, and third conductive layers, and the thickness of the first wiring layer is different from that of the second wiring layer.

9. The capacitive device as claimed in claim 1, wherein each of the second conductive layer, the second dielectric film, and the third conductive layer has an area that is the same as an area of the first conductive layer.

10. A method for fabricating a capacitive device, comprising:
    forming a first wiring layer, a first dielectric film, and a first conductive layer on a substrate;
    forming a first insulating layer on the first conductive layer;
    forming a first via in contact with the first wiring layer, the first via passing through the first insulating layer and the first dielectric film;
    forming a second conductive layer, a second dielectric film, and a third conductive layer on the first insulating layer and the first via;
    forming a second insulating layer on the first insulating layer and the third conductive layer;
    forming (i) a second via in contact with the third conductive layer, the second via passing through the second insulating layer, (ii) a third via in contact with the first conductive layer, the third via passing through the second insulating layer and the first insulating layer, and (iii) a fourth via in contact with the first wiring layer, the fourth via passing through the second insulating layer, the first insulating layer, and the first dielectric film; and
    forming a second wiring layer on the second insulating layer in contact with the second, third, and fourth vias.

11. The method as claimed in claim 10, further comprising forming a first opening through the first conductive layer and a first portion of the first dielectric film before forming the first insulating layer, wherein the first via passes through the first opening.

12. The method as claimed in claim 11, further comprising forming a second opening adjacent to the second conductive layer, the second dielectric film, and the third conductive layer and through a first portion of the first insulating layer before forming the second insulating layer, wherein the third via passes through the second opening.

13. The method as claimed in claim 12, wherein the second conductive layer, the second dielectric film, and the third conductive layer are vertically aligned with the first conductive layer.

14. The method as claimed in claim 12, further comprising:
    forming a third opening that exposes a second portion of the first dielectric film, the second portion of the first dielectric film being different from the first portion of the first dielectric film; and
    forming a fourth opening that exposes a second portion of the first insulating layer and is vertically aligned with the third opening, wherein the fourth via passes through the second opening and the fourth opening, the second portion of the first insulating layer being different from the first portion of the first insulating layer.

15. The method as claimed in claim 10, further comprising patterning the first conductive layer, exposing a first portion of the first dielectric film adjacent to a first end or edge of the patterned first conductive layer and a second portion of the first dielectric film adjacent to a second end or edge of the patterned first conductive layer before forming a first insulating layer, wherein the first via is in the first portion of the patterned first conductive layer and the fourth via is in the second portion of the patterned first conductive layer.

16. The method as claimed in claim 15, further comprising patterning the third conductive layer, the second dielectric film, and the second conductive layer to form a third opening that exposes a portion of the second insulating layer such that a portion of the first conductive layer does not vertically overlap the third conductive layer, the second dielectric film, and the second conductive layer.

17. The method as claimed in claim 16, wherein the third via and the fourth via pass through the third opening.

18. The method as claimed in claim 10, wherein forming a second wiring layer includes:
    forming a first connection wiring layer on the second insulating layer in contact with the second via and the third via; and
    forming a second connection wiring layer on the second insulating layer in contact with the fourth via, and separate from the first connection wiring layer.

* * * * *